US011232153B2

(12) United States Patent
Alonso et al.

(10) Patent No.: US 11,232,153 B2
(45) Date of Patent: Jan. 25, 2022

(54) PROVIDING QUERY RECOMMENDATIONS

(71) Applicant: Microsoft Technology Licensing, LLC, Redmond, WA (US)

(72) Inventors: Omar Rogelio Alonso, Redwood City, CA (US); Vasileios Kandylas, Sunnyvale, CA (US); Serge-Eric Tremblay, Pullman, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 16/008,823

(22) Filed: Jun. 14, 2018

(65) Prior Publication Data

US 2019/0384831 A1 Dec. 19, 2019

(51) Int. Cl.
*G06F 16/90* (2019.01)
*G06F 16/9032* (2019.01)
*G06F 16/22* (2019.01)
*G06F 16/28* (2019.01)
*G06F 16/2457* (2019.01)

(52) U.S. Cl.
CPC .... *G06F 16/90324* (2019.01); *G06F 16/2237* (2019.01); *G06F 16/2246* (2019.01); *G06F 16/2457* (2019.01); *G06F 16/285* (2019.01)

(58) Field of Classification Search
CPC .............................................. G06F 16/90324
USPC .......................................................... 707/736
See application file for complete search history.

(56) References Cited

U.S. PATENT DOCUMENTS

| 7,716,229 | B1* | 5/2010 | Srivastava | G06Q 30/02 707/749 |
|---|---|---|---|---|
| 9,690,858 | B1 | 6/2017 | Diliberto et al. | |
| 2009/0198644 | A1* | 8/2009 | Buchner | G06F 16/3322 |
| 2010/0325133 | A1* | 12/2010 | Rounthwaite | G06F 16/951 707/759 |
| 2011/0161311 | A1* | 6/2011 | Mishne | G06F 16/3322 707/719 |
| 2012/0059838 | A1* | 3/2012 | Berntson | G06F 16/951 707/759 |
| 2015/0227633 | A1* | 8/2015 | Shapira | G06F 16/338 707/706 |

(Continued)

OTHER PUBLICATIONS

"International Search Report and Written Opinion Issued in PCT Application No. PCT/US19/035907", dated Aug. 16, 2019, 12 Pages.

(Continued)

*Primary Examiner* — Syling Yen
(74) *Attorney, Agent, or Firm* — Rainier Patents, P.S.

(57) ABSTRACT

Examples are disclosed that relate to grouping query clusters based on intent of a search query. One example provides a system for generating recommended queries related to a search query, the system including a logic subsystem, and memory holding instructions executable by the logic subsystem to receive the search query, execute the search query on an index of pre-computed query clusters to identify a baseline query cluster and one or more neighboring query clusters, form a data structure including queries from within the baseline query cluster and the one or more neighboring query clusters, traverse the data structure to form a hierarchical arrangement of queries, and send the hierarchical arrangement of queries to a computing device from which the search query was received.

18 Claims, 8 Drawing Sheets

(56) References Cited

U.S. PATENT DOCUMENTS

| | | | |
|---|---|---|---|
| 2015/0242399 A1* | 8/2015 | Ramanathan | G06F 16/7847 707/723 |
| 2016/0103900 A1* | 4/2016 | Angelov | G06F 16/334 707/602 |
| 2016/0283580 A1 | 9/2016 | Amacker et al. | |
| 2019/0163782 A1* | 5/2019 | Drushku | H04L 67/26 |

OTHER PUBLICATIONS

Clauset, et al., "Finding community structure in very large networks", In Journal of Physical Review E, vol. 70, Issue 6, Dec. 6, 2004, 6 Pages.

Newman, M. E. J., "Modularity and Community Structure in Networks", In Proceedings of the National Academy of Sciences, vol. 103, No. 23, Jun. 6, 2006, pp. 8577-8582.

\* cited by examiner

PROVIDING QUERY RECOMMENDATIONS

BACKGROUND

Search engines locate and select content for presentation in response to a search query. Search engines may be used for general web searching as well as for vertical searching focused on more specific sets of content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to providing, in response to the input of a search query, recommendations of other search queries to perform. One example provides a system for generating recommended queries related to a search query, the system comprising a logic subsystem, and memory holding instructions executable by the logic subsystem to receive a search query, execute the search query on an index of pre-computed query clusters to identify a baseline query cluster and one or more neighboring query clusters, form a data structure including queries from within the baseline query cluster and the one or more neighboring query clusters, traverse the data structure to form a hierarchical arrangement of queries, and send the hierarchical arrangement of queries to a computing device from which the search query was received.

DETAILED DESCRIPTION

As mentioned above, search engines may be used in a variety of contexts, including general web searching and more limited vertical searching. For example, a person researching a country of interest may perform a broad web search regarding general information on the country, and then additional searches regarding the economy, political system, culture, geography, weather, etc. of the country. Likewise, a person contemplating an appliance purchase may perform vertical searches on a home improvement site first for the appliance type (e.g. "dishwashers"), and then additional searching for more specific information, such as specific manufacturers, models, dimensions, etc. Upon searching such queries, a search engine may cluster search results based on a determined relevance of each search result to the query. The search results then may be presented on a user interface as an ordered list, such that content determined to be more relevant to the query appears before content determined to be less relevant. Such clustering of webpage search results may enable a user to quickly review content relevant to a given query rather than attempt to pinpoint relevant content dispersed across multiple pages of search results. Further, in some instances, the search engine also may return a list of related queries for additional searching. However, the related queries are often the most frequently received queries that contain the initial search term(s), and thus may not provide any recommendations for related queries that do not contain the initial search term(s). Such related queries also may not provide information regarding different options related to, but not the target of, an initial search query (e.g., queries related to a different foreign country, a competitor's appliance brand, etc.).

Accordingly, examples are disclosed that relate to providing, in response to a search query, recommendations of additional related queries that may be input to search for additional information related to the search query. To produce the recommendations, a search query may be executed on an index of pre-computed query clusters to identify a most relevant query cluster (e.g., a query cluster containing queries determined to be most relevant to the search query) and one or more neighboring query clusters, and to form a data structure (e.g., a tree-based data structure such as a suffix array) including queries from within the determined most relevant query cluster and the one or more neighboring query clusters. The data structure may be traversed to form a hierarchical arrangement of queries, and the hierarchical arrangement may be sent to a computing device from which the search query was received. By computing query clusters prior to runtime, which may be time-consuming and involve many iterations while operating on millions or billions of queries within a query search log, the disclosed examples may reduce computation performed during runtime. Further, by providing a user with queries spanning a potential space of intent related to an initial search query, the disclosed examples may also help to increase the efficiency of a user search session, which also increases the efficiency of a computing device.

Figure 1:
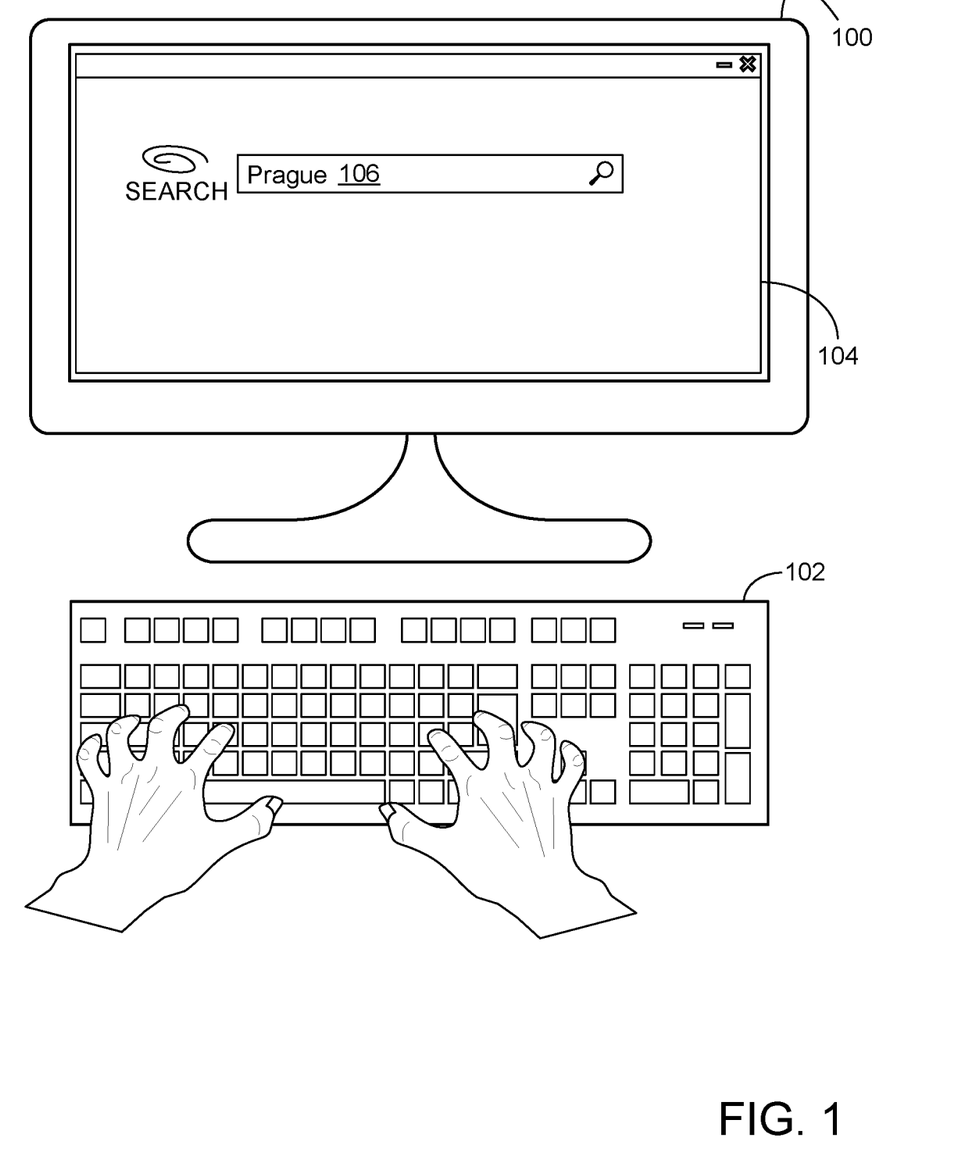
FIG. 1 shows an example scenario in which a user of a computing device inputs a search query.
Figure 2:
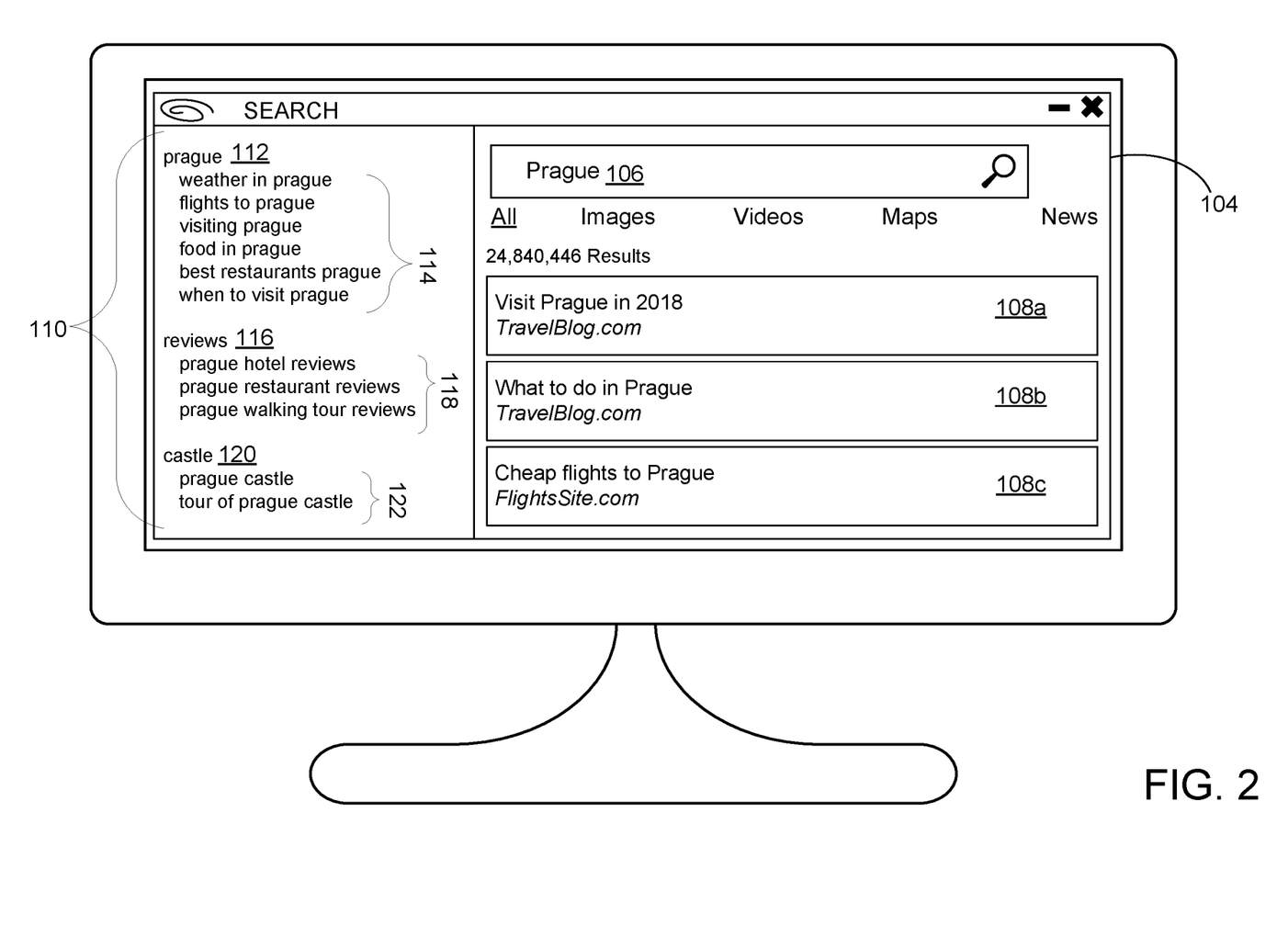
FIG. 2 shows example search results and query recommendations provided in response to the query of FIG. 1.

FIGS. 1 and 2 depict an example scenario illustrating the display of recommended related queries in response to the input of a search query. First referring to FIG. 1, a user inputs via a keyboard 102 a search for the term "Prague" to a search engine application user interface 104 displayed by a computing device 100. In other examples, search queries may be input via other input mechanisms, such as by microphone, touch, or gesture. While depicted as a desktop computing device 100 in the example of FIG. 1, any suitable computing device may be used, such as a laptop, tablet, headless computing device (e.g., smart speaker), wearable computing device (e.g., head-mounted display device, wrist-worn device), and mobile computing device (e.g. smart phone).

FIG. 2 illustrates examples results of the search of FIG. 1. The results include search results 108a-c, and a hierarchical arrangement 110 of recommended queries determined to be relevant to the search query 106. The hierarchical arrangement 110 is arranged in a nested presentation. In this example, one cluster of queries comprises the user's original query 112 "Prague", and a plurality of other related queries 114 nested beneath the first query 112 (e.g. weather in Prague, flights to Prague). The hierarchical arrangement 110 of queries also includes a second query 116, "reviews", and a plurality of queries 118 associated with the second query 116 nested beneath the second query 116.

In the example in FIG. 2, each query in the hierarchical arrangement 110 of queries is displayed as a link that is selectable to input the displayed query into a search engine. In another example, the hierarchical arrangement of queries may be output via a speaker, and each query in the hierarchical arrangement of queries may be selectable via a voice command.

Figure 3:
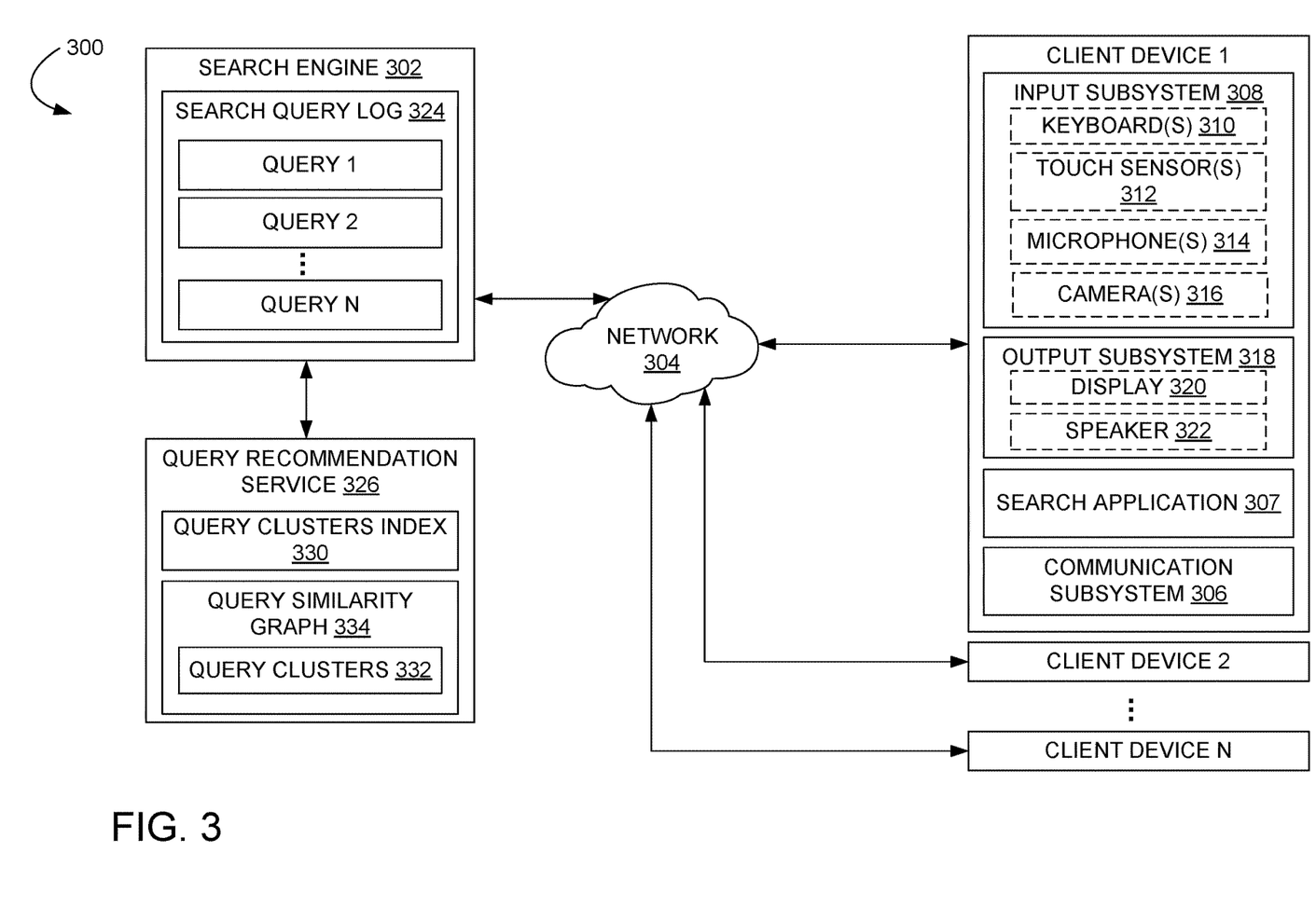
FIG. 3 shows a block diagram illustrating an example use environment for a query recommendation service.

FIG. 3 shows a block diagram illustrating an example computing environment 300 for implementing a query recommendation service. Environment 300 includes a plurality of client devices (illustrated as client devices 1 through N), each communicatively coupled to a search engine 302 over a network 304 via a communications subsystem 306. Each client device 1 through N comprises a search application 307 providing search functionalities, such as a web browser or travel planning application, that is configured to execute a database and/or web search via search engine 302 for a received query.

Each client device 1 through N comprises an input subsystem 308 including one or more input devices, such as a keyboard 310, a touch sensor 312, a microphone 314, and/or a camera 316. Each client device 1 through N further comprises an output subsystem 318 including one or more output devices, such as one or more display(s) 320 and/or speaker(s) 322. More details on example hardware configurations are described below with reference to FIG. 8.

The search engine 302 maintains a search query log 324 comprising a list of search queries received from client devices. The search engine 302 is communicatively coupled with a query recommendation service 326 that is configured to generate lists of recommended queries related to a search query. As mentioned above, the query recommendation service 326 organizes search queries from the search query log 324 into clusters. The identified clusters are indexed in a query clusters index 330 against which received queries can be compared to identify similar queries for recommendation. The formation of query clusters 332 may be performed pre-runtime (prior to receiving a search query) using a query similarity graph 334.

Figure 4:
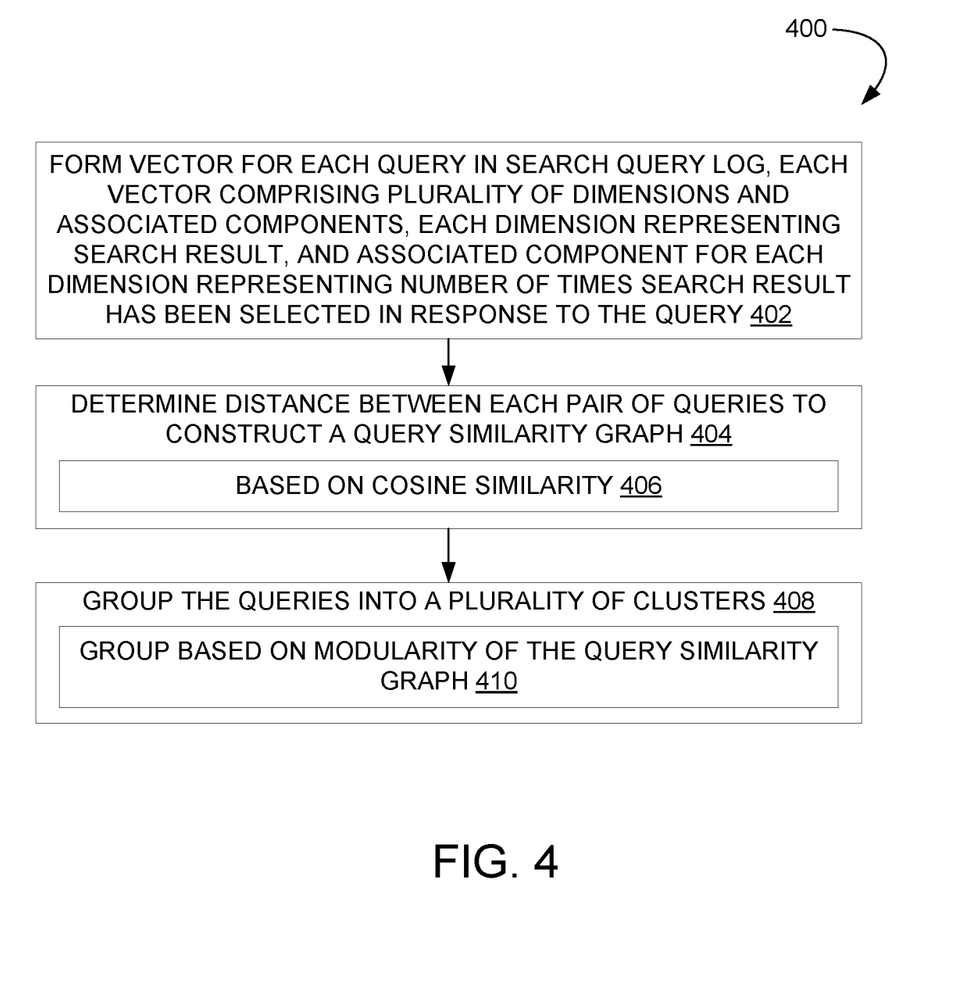
FIG. 4 shows a flowchart illustrating an example method for generating an index of pre-computed query clusters.

FIG. 4 shows a flowchart illustrating an example method 400 for generating query clusters from queries in a query log. Method 400 may be implemented as stored instructions executable by a computing system, such as a web search service or a website that implements vertical search functionalities. At 402, method 400 comprises forming a vector for each query in a search query log. Each vector may comprise a plurality of dimensions A, B, C, . . . , N and associated components $a_1, b_1, c_1, \ldots, n_1$, wherein each dimension represents a search result, and the associated component for each dimension represents a number of times the search result has been selected in response to the query. Equation 1 shows an example vector representation of a query $Q_1$, where component $a_1$ represents the number of times the search result A has been selected in response to the query $Q_1$.

$$Q_1: <a_1A+b_1B+c_1C+ \ldots +n_1N> \quad (1)$$

At 404, method 400 comprises determining a distance between each pair of queries to construct a query similarity graph. The query similarity graph may comprise a weighted, undirected graph in which the plurality of queries $Q_1$ through $Q_N$ are vertices of the graph, and edges between the vertices represent similarities between each pair of queries. Any suitable similarity computation may be used. In some examples, determining the distance between each pair of queries comprises, at 406, determining a cosine similarity between each pair of vectors that represent each pair of queries. Other example similarity measures that may be used include Jaccard coefficient, Sørensen-Dice coefficient, edit distance (e.g., Hamming distance, etc.), inner product, normalized mutual information and/or a custom-built similarity measure.

At 408, method 400 comprises grouping the queries into a plurality of query clusters. Any suitable algorithm may be used to cluster the queries, including hierarchical agglomerative clustering, k-means clustering, and/or spectral clustering. Grouping the queries into a plurality of query clusters also may comprise grouping the queries based on modularity of the query similarity graph, as indicated at 410. In some examples, grouping the queries into a plurality of query clusters based on modularity of the query similarity graph comprises forming a plurality of clusters that each comprise a single query (e.g., each vertex or node of the query similarity graph is an individual cluster), and for each combination of clusters, determining whether merging the clusters will increase modularity of the query similarity graph. Clusters which cause the modularity of the query similarity graph to increase then may be merged. This process may be performed until no further merging of clusters would increase the modularity of the query similarity graph. In other examples, optimizing modularity of the query similarity graph may comprise grouping the queries into a single cluster (e.g., all vertices and nodes within the same cluster), determining which divisions of the initial cluster into separate clusters will result in increased modularity of the query similarity graph, and continuing to divide the cluster(s) until no further division of a cluster(s) would increase the modularity. In this manner, method 400 transforms the undirected graph of search queries into clusters that each include densely-connected queries, and also provides information regarding which clusters are closely related to other clusters.

Figure 5:
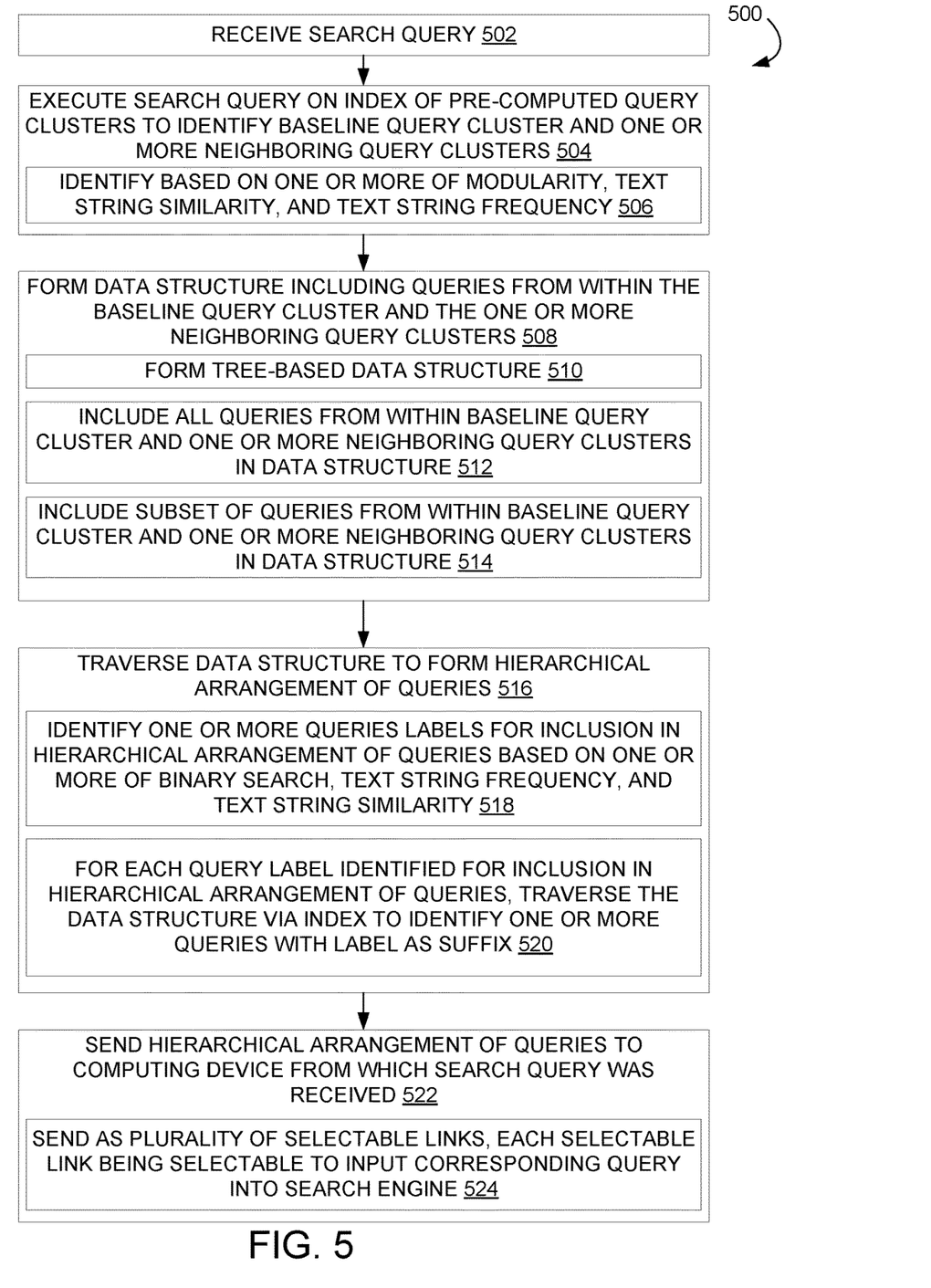
FIG. 5 shows a flowchart illustrating an example method for providing a hierarchical arrangement of query clusters in response to a search query.

Once the query clusters have been formed, the clusters may be indexed and then used for providing query recommendations. FIG. 5 shows a flowchart illustrating an example method 500 for forming a hierarchical arrangement of queries during runtime. Method 500 may be implemented as stored instructions executable by a computing system, such as a search service, to perform the method.

At 502, method 500 comprises receiving an input of search query, e.g. from a remote computing device. At 504, method 500 comprises executing the search query on an index of pre-computed query clusters to identify a baseline query cluster and one or more neighboring query clusters. The baseline query cluster comprises a plurality of queries determined to be most relevant to the search query, and the one or more neighboring query clusters comprises neighboring clusters to the baseline query cluster that are also determined to be relevant to the search query. The relevance of the baseline cluster and other clusters may be determined in any suitable manner. For example, the baseline cluster may be identified based upon the cluster containing the initial search query, and the neighboring clusters may be identified based upon the modularity of the graph, e.g. by how strongly connected each neighboring query cluster is to the baseline query cluster as determined by distance between nodes. As another example, the baseline query cluster and/or neighboring query cluster(s) may be identified using statistical methods for calculating frequencies such as term frequency (TF), term frequency-inverse document frequency (TFIDF), and other similar normalizations. Identifying the baseline query cluster using term frequency may comprise identifying a query cluster in which the most frequently occurring query is the initial search query, or a query cluster in which the initial search query appears more often than in other query clusters. As yet another example, the baseline query cluster and/or a neighboring query cluster may be identified via text string similarity, such as by identifying a query cluster in which text strings of queries comprise the greatest similarity to the initial search query. Neighboring query clusters identified in this manner may include queries related to other options than that specified in the original query, such as other destinations, activities, product brands, etc.

At 508, method 500 comprises selecting a plurality of queries from the baseline query cluster and one or more neighboring query clusters, and forming a data structure from the selected queries. In some examples, forming the data structure may comprise forming a tree-based data structure (e.g., a suffix array), as indicated at 510. In other examples, any other suitable data structure may be used. In some examples, as indicated at 512, all queries from within the baseline query cluster and the one or more neighboring query clusters may be selected for forming the data structure. In other examples, as indicated at 514, the data structure may be formed from a subset of queries from within the baseline query cluster and/or the one or more neighboring query clusters. In such examples, a different number of queries may be taken from the baseline query cluster and a neighboring query cluster or clusters, or a same number may be taken from each cluster. As a more specific example, a larger number of queries may be taken from the baseline cluster than from each neighboring cluster. The inclusion of queries from neighboring query clusters when forming the data structure may form a hierarchical arrangement of queries that provides a logical pivot toward tasks related to an initial search query (e.g., a search for a plane ticket may be followed by a search for a hotel and/or activities).

Figure 6:
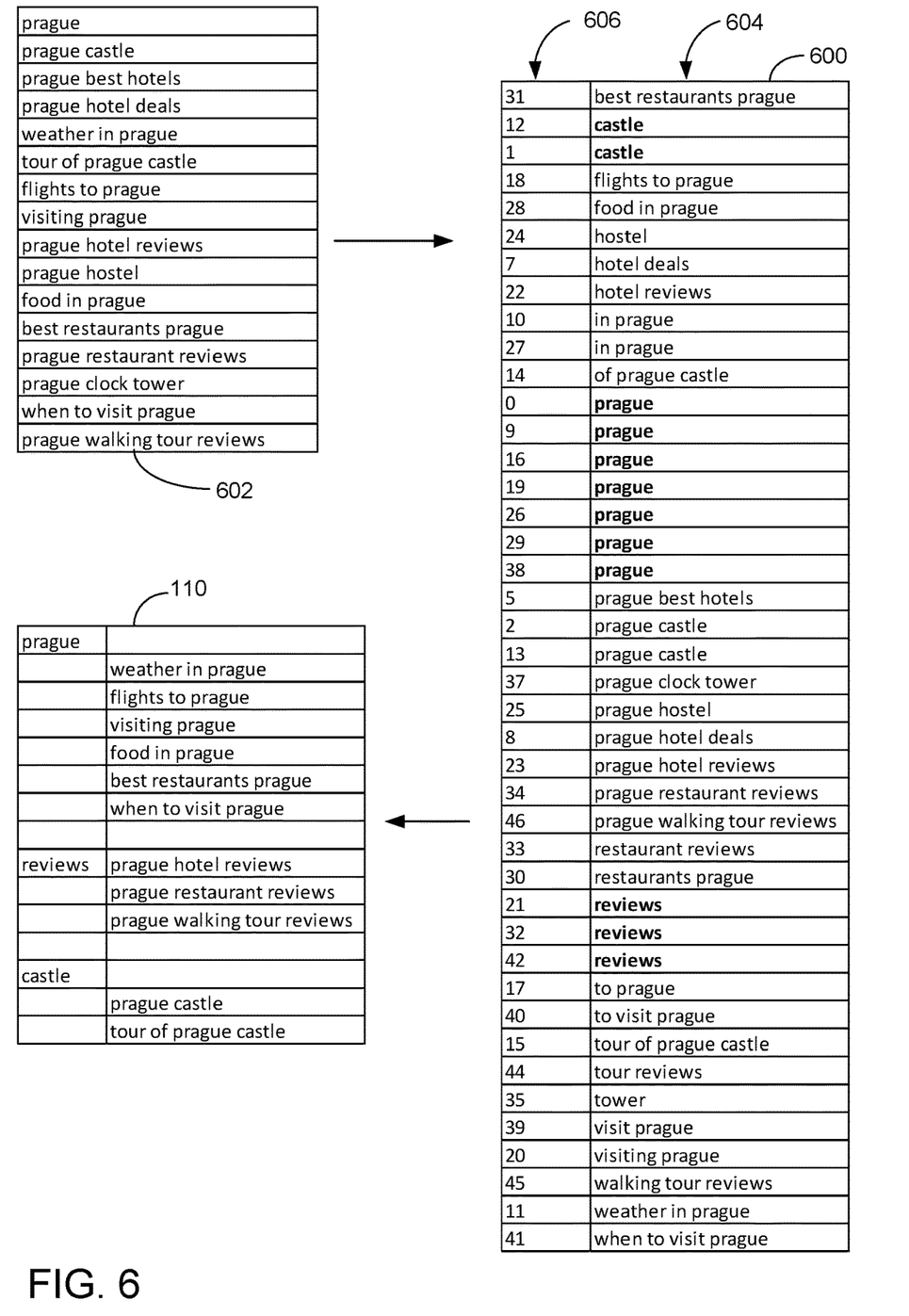
FIG. 6 illustrates the construction of an example data structure, and the construction of an example hierarchical arrangement of queries formed by traversing the data structure.

FIG. 6 illustrates an example tree-based data structure 600 in the form of a suffix array. The tree-based data structure 600 includes a subset 602 of queries from within a baseline query cluster and one or more neighboring query clusters identified by searching the search query "Prague." In this example, the tree-based data structure 600 is ordered lexicographically by the first term in each suffix. The tree-based data structure 600 also comprises an index 606 identifying an order in which each suffix 604 appears in the subset 602 of queries.

Continuing with FIG. 5, method 500 comprises, at 516, traversing the data structure to form a hierarchical arrangement of queries. In some examples, traversing the data structure may comprise identifying one or more queries labels for inclusion in the hierarchical arrangement of queries based on one or more of a binary search, a text string frequency, and a text string similarity, as indicated at 518. As a more specific example, and referring again to FIG. 6, a label for a first hierarchical group of queries may be identified by performing a binary search to locate the original query "Prague" in the data structure. Other queries to group with this query in the hierarchical arrangement of recommended queries may be located, for example, by, for each instance of the term "Prague" in the data structure, traversing the structure via the tree index 606 to identify longer strings including this term as a suffix, as indicated at 520. For example, the query "weather in Prague" is located by traversing the index from the instance of Prague at index location nine to the term "in Prague" at index location 10, and "weather in Prague" at index location 11. Each query identified in this manner may then be output as nested beneath the label "Prague." In this example, the original query is a single word, and may act as the label for other queries related to this term. In other examples where the original search query comprises multiple words, a suffix of the original search query (e.g. a last term of the query) may be used as a search label. In yet other examples, an entity mentioned in query terms, a stemmed version of a query term(s), and/or a closely related term(s) to a query term(s) (e.g., identified via a query alteration service, autocorrect, etc.) may be used as a search label.

Labels for categories of related search queries also may be located by text string frequency (e.g. using an n-gram term frequency algorithm) to identify frequently occurring terms. Referring again to FIG. 6, the terms "reviews" and "castle" may be identified as query labels based on term frequency, and queries having this term as the suffix may be nested beneath these labels in the hierarchical arrangement of query clusters. The identification of labels and related queries may continue until a threshold condition is met (e.g. when no terms remain with a threshold term frequency).

Once one or more subentries of the tree-based data structure proximate to the query are identified for each query, method 500 comprises merging the one or more query labels and the associated subentries to form the hierarchical arrangement of queries. In the examples of FIGS. 2 and 6, the hierarchical arrangement 110 of queries includes a nested arrangement of queries associated with the query "Prague", a nested arrangement of queries associated with the query "reviews", and a nested arrangement of queries associated with the query "castle" merged together to form the hierarchical arrangement 110 of queries. Any suitable number of related queries may be listed beneath each query label. In some examples, all queries having the label as a suffix may be grouped under the label, while in other examples the queries grouped under the label may be within a threshold similarity of the initial search query. In any case, the results are organized in a manner that may be considered to be a sequence or list of tasks (e.g., weather in the city, hotel reviews, things to do, etc.) that users (in aggregate) perform, and that predicts other possible actions that the user may wish to consider or take by allowing individual users to identify clusters of similar items. Referring briefly again to FIG. 2, the depicted hierarchical arrangement of queries provides a sequence of search clusters including introductory information about Prague 112, 114, reviews for selecting lodging, food, and activities to do in Prague 116, 118, and information regarding a popular point of interest in Prague 120, 122.

Further, as mentioned above, a hierarchical arrangement of queries may include queries on different, but related, topics. While not shown in FIG. 6, the baseline query cluster and/or neighboring query cluster(s) identified for the initial search query "Prague" may include queries regarding another foreign city, other countries, etc. This may facilitate discovering additional content of interest.

At 522, method 500 comprises sending the hierarchical arrangement of queries to the computing device from which the search query was received. Sending the hierarchical arrangement of queries to the computing device may comprise sending the hierarchical arrangement of queries as a plurality of selectable links, where each selectable link is selectable to input the corresponding query into a search engine, as indicated at 524. Sending the hierarchical arrangement of queries to the computing device may additionally or alternatively comprise sending relevant content (e.g., search results) related to each query in the hierarchical arrangement of queries to the computing device. This may help to proactively present the relevant content and thus may reduce a number of searches executed during a use session, which may help reduce computation. In other examples, the hierarchical arrangement of queries may be sent in any other suitable form.

Figure 7:
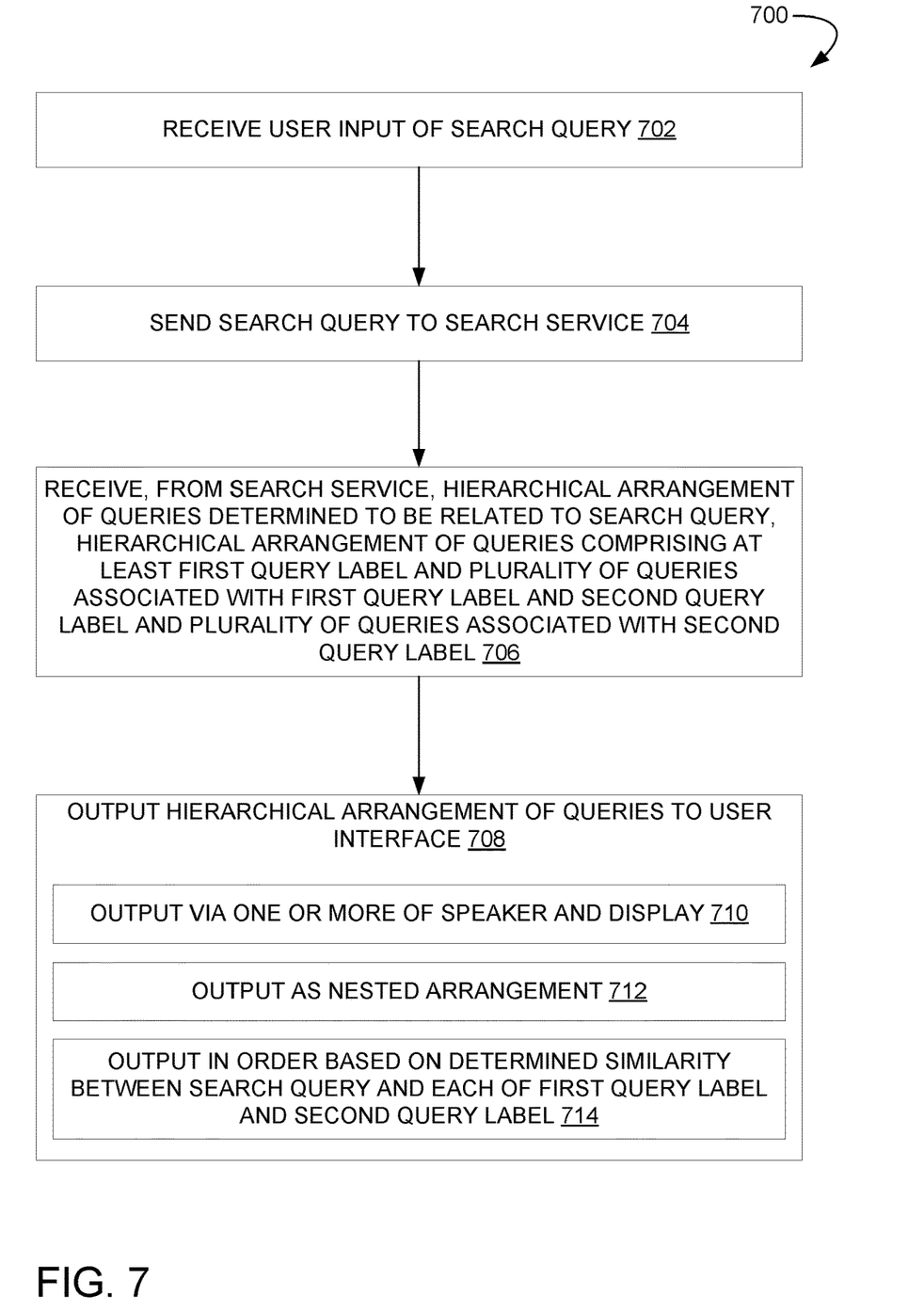
FIG. 7 shows a flowchart illustrating an example method for obtaining a hierarchical arrangement of queries related to a search query.

FIG. 7 shows a flowchart illustrating an example method 700 for obtaining a hierarchical arrangement of queries related to a search query. Method 700 may be implemented as stored instructions executable by a client computing device in communication with a search service, for example. At 702, method 700 comprises receiving user input of a search query (e.g. by speech, keyboard, touch sensor, and/or other suitable user input device(s)). At 704, method 700 comprises sending the search query to a query recommendation service via a communications subsystem of the computing device, and at 706, receiving from the query recommendation service a hierarchical arrangement of queries determined to be related to the search query. The hierarchical arrangement of queries received from the query recommendation service may comprise at least a first query label and a plurality of queries associated with the first query label, and a second query label and a plurality of queries associated with the second query label.

At 708, method 700 comprises outputting the hierarchical arrangement of queries to a user interface, e.g. via a speaker and/or a display 710. The queries may be arranged in any suitable manner, such as in a nested arrangement 712. Further, in some examples, the queries may be ordered based on a determined similarity between the search query and each of the first query label and the second query label, as indicated at 714 (e.g. using a cosine similarity or other suitable similarity computation). A user then may simply select one of the queries in the hierarchical list of queries to perform an additional search.

In some embodiments, the methods and processes described herein may be tied to a computing system of one or more computing devices. In particular, such methods and or processes may be implemented as a computer-application program or service, an application-programming interface (API), a library, and/or other computer-program product.

Figure 8:
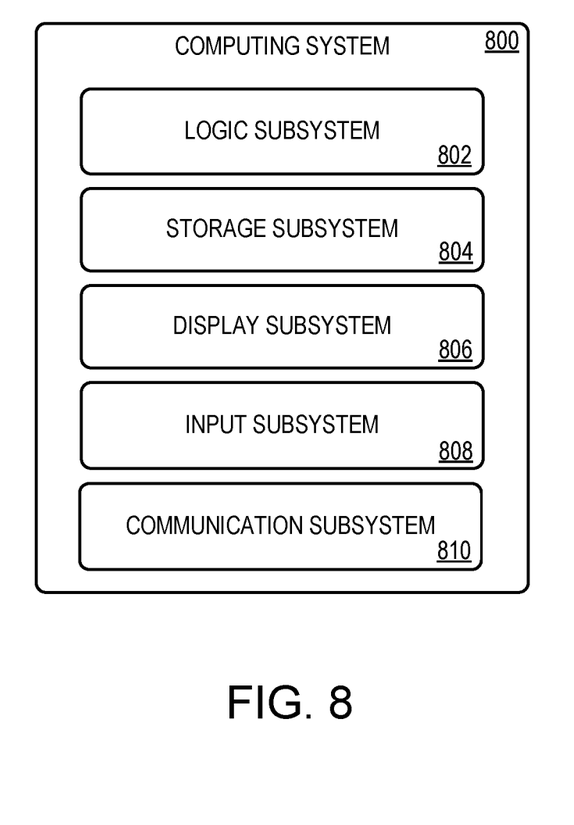
FIG. 8 shows a block diagram illustrating an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine 802 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine 802 may include one or more hardware or firmware logic machines configured to execute hardware or firmware instructions. Processors of the logic machine 802 may be single-core or multi-core, and the instructions executed thereon may be configured for sequential, parallel, and/or distributed processing. Individual components of the logic machine 802 optionally may be distributed among two or more separate devices, which may be remotely located and/or configured for coordinated processing. Aspects of the logic machine 802 may be virtualized and executed by remotely accessible, networked computing devices configured in a cloud-computing configuration.

Storage machine 804 includes one or more physical devices configured to hold instructions executable by the logic machine 802 to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "engine" may be used to describe an aspect of computing system 800 implemented to perform a particular function. In some cases, a program or engine may be instantiated via logic machine 802 executing instructions held by storage machine 804. It will be understood that different programs and/or engines may be instantiated from the same application, service, code block, object, library, routine, API, function, etc. Likewise, the same program and/or engine may be instantiated by different applications, services, code blocks, objects, routines, APIs, functions, etc. The terms "program" and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem 810 may be configured for communication via a wireless telephone network, or a wired or wireless local- or wide-area network. In some embodiments, the communication subsystem 810 may allow computing system 800 to send and/or receive messages to and/or from other devices via a network such as the Internet.

Another example provides a system for generating recommended queries related to a search query, the system comprising a logic subsystem and memory holding instructions executable by the logic subsystem to receive the search query, execute the search query on an index of pre-computed query clusters to identify a baseline query cluster and one or more neighboring query clusters, form a data structure including queries from within the baseline query cluster and the one or more neighboring query clusters, traverse the data structure to form a hierarchical arrangement of queries, and send the hierarchical arrangement of queries to a computing device from which the search query was received. In such an example, the instructions may be additionally or alternatively executable to generate the index of pre-computed query clusters by forming a vector for each query in a search query log, each vector comprising a plurality of dimensions and associated components, each dimension representing a search result and the associated component for each dimension representing a number of times the search result has been selected in response to the query, determining a distance between each pair of the queries to construct a query similarity graph, and grouping the queries into a plurality of clusters of queries. In such an example, the instructions may be additionally or alternatively executable to determine the distance between each pair of the two or more queries based on one or more of cosine similarity, Jaccard coefficient, Sørensen-Dice coefficient, edit distance, inner product, normalized mutual information and/or a custom-built similarity measure. In such an example, the instructions may be additionally or alternatively executable to send the hierarchical arrangement of queries as a plurality of selectable links, each selectable link being selectable to input a corresponding query into a search engine. In such an example, the instructions may be additionally or alternatively executable to traverse the data structure to identify one or more query labels for inclusion in the hierarchical arrangement of queries based on one or more of a binary search, a term frequency, and a text string similarity. In such an example, the instructions may be additionally or alternatively executable to, for each query label of the one or more query labels identified for inclusion in the hierarchical arrangement of queries, traverse the data structure via an index to identify one or more related queries comprising the query label for inclusion in the hierarchical arrangement of queries. In such an example, the instructions may be additionally or alternatively executable to form the data structure as a tree-based data structure. In such an example, the instructions may be additionally or alternatively executable to form the data structure by including all of the queries from within the baseline query cluster and the one or more neighboring query clusters in the data structure. In such an example, the instructions may be additionally or alternatively executable to form the data structure by including a subset of the queries from within the baseline query cluster and the one or more neighboring query clusters in the data structure.

Another example provides a computing device, comprising an output subsystem comprising one or more output devices, an input subsystem comprising one or more input devices, a logic subsystem, and memory holding instructions executable by the logic subsystem to receive user input of a search query, send the search query to a query recommendation service, receive, from the query recommendation service, a hierarchical arrangement of queries determined to be related to the search query, the hierarchical arrangement of queries comprising at least a first query label and a plurality of queries associated with the first query label, and a second query label and a plurality of queries associated with the second query label, and output the hierarchical arrangement of queries to a user interface. In such an example, the instructions may be additionally or alternatively executable to output the hierarchical arrangement of queries via one or more of a speaker and a display. In such an example, the computing device may additionally or alternatively comprise one or more of a desktop computing device, a laptop computing device, a mobile computing device, a wearable computing device, and a headless computing device. In such an example, the instructions may be additionally or alternatively executable to output the hierarchical arrangement of queries as a nested arrangement. In such an example, the instructions may be additionally or alternatively executable to output the hierarchical arrangement of queries in an order based on a determined similarity between the search query and each of the first query label and the second query label.

Another example provides a machine-implemented method, comprising receiving a search query, executing the search query on an index of pre-computed query clusters to identify a baseline query cluster and one or more neighboring query clusters, forming a data structure including one or more queries from within the baseline query cluster and the one or more neighboring query clusters, traversing the data structure to form a hierarchical arrangement of queries from the baseline query cluster and the one or more neighboring query clusters, and sending the hierarchical arrangement of queries to a computing device from which the search query was received. In such an example, the method may additionally or alternatively comprise, prior to receiving the search query, forming a vector for each query in a search query log, each vector comprising a plurality of dimensions and associated components, each dimension representing a search result and the associated component for each dimension representing a number of times the search result has been selected in response to the query, determining a distance between each pair of queries to construct a query similarity graph, and grouping the queries into a plurality of clusters of queries. In such an example, executing the search query on the index of pre-computed query clusters may additionally or alternatively comprise identifying the baseline query cluster and the one or more neighboring query clusters based on one or more of modularity of a query similarity graph, a term frequency within the pre-computed query clusters, and a text string similarity between the search query and queries within the pre-computed query clusters. In such an example, traversing the data structure to form a hierarchical arrangement of queries may additionally or alternatively comprise traversing the data structure to identify one or more query labels for inclusion in the hierarchical arrangement of queries based on one or more of a binary search, a text string similarity, and a text string frequency. In such an example, traversing the data structure to form the hierarchical arrangement of queries may additionally or alternatively comprise, for each query label of the one or more query labels identified for inclusion in the hierarchical arrangement of queries, traversing the data structure via an index to identify one or more subentries of the data structure proximate to the query label. In such an example, sending the hierarchical arrangement of queries to the computing device may additionally or alternatively comprise sending to the computing device a nested arrangement of queries, the nested arrangement of queries comprising at least a first query label and a plurality of queries determined to be associated with the first query label nested beneath the first query label.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system comprising:
a logic subsystem; and
memory holding instructions executable by the logic subsystem to:
generate an index of pre-computed query clusters by:
forming a vector for each respective query in a search query log, each respective vector comprising a plurality of dimensions and associated components, each respective dimension representing a respective search result and the associated component for each respective dimension representing a number of times the respective search result has been selected in response to the respective query,
determining distances between respective query pairs to construct a query similarity graph, and
grouping individual queries in the query similarity graph into a plurality of query clusters,
receive an input search query from a computing device, the input search query comprising one or more search words,
execute the input search query on the index of pre-computed query clusters to identify a baseline query cluster, a first neighboring query cluster, and a second neighboring query cluster,
form a data structure including a plurality of related queries that are related to the input search query, the plurality of related queries including baseline related queries from within the baseline query cluster, first related queries from within the first neighboring query cluster, and second related queries from within the second neighboring query cluster, wherein each related query in the data structure comprises one or more words that are related to the input search query,
traverse the data structure to form a hierarchical arrangement of related queries, and
send the hierarchical arrangement of related queries to the computing device from which the input search query was received.

2. The system of claim 1, wherein the instructions are executable to:
determine the distances based at least on one or more of cosine similarity, Jaccard coefficient, Sørensen-Dice coefficient, edit distance, inner product, normalized mutual information and/or a custom-built similarity measure.

3. The system of claim 1, wherein the instructions are executable to:
send the hierarchical arrangement of related queries as a plurality of selectable links, each selectable link being selectable to input a corresponding query into a search engine.

4. The system of claim 1, wherein the instructions are executable to:
traverse the data structure to identify a plurality of query labels for inclusion in the hierarchical arrangement of related queries based on one or more of a binary search, a term frequency, and a text string similarity.

5. The system of claim 4, wherein the instructions are executable to:
for each query label of the plurality of query labels identified for inclusion in the hierarchical arrangement of related queries, traverse the data structure to identify the plurality of related queries.

6. The system of claim 1, wherein the instructions are executable to:
form the data structure as a tree-based data structure.

7. The system of claim 1, wherein the instructions are executable to:
form the data structure by including all of the baseline related queries from within the baseline query cluster, all of the first related queries from within the first neighboring query cluster, and all of the second related queries from within the second neighboring query cluster in the data structure.

8. The system of claim 1, wherein the instructions are executable to:
form the data structure by including a first subset of less than all of the first related queries from within the first neighboring query cluster, a second subset of less than all of the second related queries from within the second neighboring query cluster, and a third subset of less than all of the baseline related queries from within the baseline query cluster in the data structure.

9. A machine-implemented method, comprising:
generating an index of pre-computed query clusters by:
forming a vector for each respective query in a search query log, each respective vector comprising a plurality of dimensions and associated components, each respective dimension representing a respective search result and the associated component for each respective dimension representing a number of times the respective search result has been selected in response to the respective query,
determining distances between respective query pairs to construct a query similarity graph, and
grouping individual queries in the query similarity graph into a plurality of query clusters,
receiving an input search query, the input search query comprising one or more search words;
executing the input search query on the index of pre-computed query clusters to identify a baseline query cluster, a first neighboring query cluster, and a second neighboring query cluster;
forming a data structure including a plurality of related queries that are related to the input search query, the plurality of related queries including baseline related queries from within the baseline query cluster, first related queries from within the first neighboring query cluster, and second related queries from within the second neighboring query cluster, wherein each related query in the data structure comprises one or more words that are related to the input search query;
traversing the data structure to form a hierarchical arrangement of related queries; and
sending the hierarchical arrangement of related queries to a computing device from which the input search query was received.

10. The machine-implemented method of claim 9, wherein executing the input search query on the index of pre-computed query clusters comprises identifying the baseline query cluster, the first neighboring query cluster, and the second neighboring query cluster based on one or more of modularity of the query similarity graph, a term frequency within the pre-computed query clusters, and a text string similarity between the input search query and individual queries within the pre-computed query clusters.

11. The machine-implemented method of claim 9, wherein traversing the data structure to form the hierarchical arrangement of related queries comprises traversing the data structure to identify one or more query labels for inclusion in the hierarchical arrangement of related queries based on one or more of a binary search, a text string similarity, and a text string frequency.

12. The machine-implemented method of claim 11, wherein traversing the data structure to form the hierarchical arrangement of related queries comprises, for each respective query label of the one or more query labels identified for inclusion in the hierarchical arrangement of related queries, traversing the data structure to identify one or more subentries of the data structure proximate to the respective query label.

13. The machine-implemented method of claim 9, wherein sending the hierarchical arrangement of related queries to the computing device comprises sending to the computing device a nested arrangement of queries, the nested arrangement of queries comprising at least three different query labels for the baseline related queries from the baseline query cluster, the first related queries from the first neighboring query cluster, and the second related queries from the second neighboring query cluster.

14. One or more physical storage devices storing executable instructions which, when executed by one or more processors, cause the one or more processors to perform acts comprising:
generating an index of pre-computed query clusters by:
forming a vector for each respective query in a search query log, each respective vector comprising a plurality of dimensions and associated components, each respective dimension representing a respective search result and the associated component for each respective dimension representing a number of times the respective search result has been selected in response to the respective query,
determining distances between respective query pairs to construct a query similarity graph, and
grouping individual queries in the query similarity graph into a plurality of query clusters,
receiving an input search query, the input search query comprising one or more search words;
executing the input search query on the index of pre-computed query clusters to identify a baseline query cluster, a first neighboring query cluster, and a second neighboring query cluster;
forming a data structure including a plurality of related queries that are related to the input search query, the plurality of related queries including baseline related queries from within the baseline query cluster, first related queries from within the first neighboring query cluster, and second related queries from within the second neighboring query cluster, wherein each related query in the data structure comprises one or more words that are related to the input search query;
traversing the data structure to form a hierarchical arrangement of related queries; and
sending the hierarchical arrangement of related queries to a computing device from which the input search query was received.

15. The one or more physical storage devices of claim 14, wherein the input search query includes the name of a city, and each of the baseline related queries from the baseline query cluster, the first related queries from the first neighboring query cluster, and the second related queries from the second neighboring query cluster also includes the name of the city.

16. The one or more physical storage devices of claim 14, wherein the input search query includes the name of a city and the second related queries from the second neighboring query cluster each include the name of a different city.

17. The one or more physical storage devices of claim 14, wherein the hierarchical arrangement includes suggested queries from each of the baseline query cluster, the first neighboring query cluster, and the second neighboring query cluster.

18. The one or more physical storage devices of claim 17, wherein each suggested query in the hierarchical arrangement includes a particular search word of the input search query.

* * * * *